US009406226B2

(12) United States Patent
Kesting et al.

(10) Patent No.: US 9,406,226 B2
(45) Date of Patent: Aug. 2, 2016

(54) METHODS OF PROVIDING TRAFFIC FLOW MESSAGES

(71) Applicant: TomTom Development Germany GmbH, Leipzig (DE)

(72) Inventors: Arne Kesting, Berlin (DE); Stefan Lorkowski, Berlin (DE); David Schilling, Berlin (DE); Nikolaus Witte, Berlin (DE)

(73) Assignee: TomTom Development Germany GmbH, Leipzig (DE)

( * ) Notice: Subject to any disclaimer, the term of this patent is extended or adjusted under 35 U.S.C. 154(b) by 0 days.

(21) Appl. No.: 14/411,540

(22) PCT Filed: Jul. 1, 2013

(86) PCT No.: PCT/EP2013/063789
§ 371 (c)(1),
(2) Date: Dec. 29, 2014

(87) PCT Pub. No.: WO2014/001561
PCT Pub. Date: Jan. 3, 2014

(65) Prior Publication Data

US 2015/0161886 A1 Jun. 11, 2015

(30) Foreign Application Priority Data

Jun. 29, 2012 (GB) .................................. 1211618.2

(51) Int. Cl.
*G08G 1/01* (2006.01)
*G01C 21/30* (2006.01)

(52) U.S. Cl.
CPC .................. *G08G 1/01* (2013.01); *G08G 1/012* (2013.01); *G08G 1/0141* (2013.01)

(58) Field of Classification Search
CPC .......... G08G 1/01; G01C 21/30; G06F 15/16; G06Q 50/30
USPC .................... 701/117, 118, 119, 423; 705/13; 709/206, 203
See application file for complete search history.

(56) References Cited

U.S. PATENT DOCUMENTS 7,366,606 B2 4/2008 Uyeki
8,180,558 B1 5/2012 Marko
(Continued)

FOREIGN PATENT DOCUMENTS

AU 2009236035 A1 6/2010
CN 102411841 A 4/2012
(Continued)

OTHER PUBLICATIONS

Search Report issued Oct. 10, 2012 for United Kingdom Patent Application No. 1211618.2.
(Continued)

*Primary Examiner* — Tan Q Nguyen

(57) ABSTRACT

A method of verifying and/or improving a message indicative of an event affecting traffic flow on at least a portion of one or more navigable segments is described. The method involves obtaining positional data relating to the movement of a plurality of devices along a navigable stretch including a navigable stretch identified by the message as being affected, and using the positional data to verify and/or improve the message. The positional data is live data and is used to obtain data relating to the speed of travel of the devices along the navigable stretch including the stretch identified by the message. The speed data can be used to determine a spatial extent of the affected stretch and/or an expected speed of travel along the stretch.

19 Claims, 5 Drawing Sheets

(56) References Cited

U.S. PATENT DOCUMENTS

| | | | | |
|---|---|---|---|---|
| 8,452,771 | B2 * | 5/2013 | Kurciska | G06F 17/30241 701/423 |
| 8,718,910 | B2 | 5/2014 | Gueziec | |
| 2005/0222751 | A1 | 10/2005 | Uyeki | |
| 2011/0106416 | A1 | 5/2011 | Scofield et al. | |
| 2012/0123667 | A1 | 5/2012 | Gueziec | |
| 2013/0018705 | A1 * | 1/2013 | Heath | G08G 1/017 705/13 |

FOREIGN PATENT DOCUMENTS

| | | | |
|---|---|---|---|
| DE | 102006041668 | A1 | 3/2008 |
| FR | 2784486 | A1 | 4/2000 |

OTHER PUBLICATIONS

International Search Report issued Jan. 3, 2014 for International PCT Application No. PCT/EP2013/063789.

* cited by examiner

METHODS OF PROVIDING TRAFFIC FLOW MESSAGES

CROSS-REFERENCES TO RELATED APPLICATIONS

This application is the National Stage of International Application No. PCT/EP2013/063789, filed Jul. 1, 2013 and designating the United States. The application claims priority from United Kingdom Patent Application No. 1211618.2 filed Jun. 29, 2012. The entire content of both these applications is incorporated herein by reference.

FIELD OF THE INVENTION

The present invention relates to methods and systems for verifying and/or improving a message indicative of an event having an effect upon traffic flow on at least a portion of one or more navigable segments.

BACKGROUND TO THE INVENTION

Road users increasingly rely upon traffic flow information to inform them of any incidents which may affect travel time on a journey, and to help plan travel. Such information may be provided to a user during navigation along a route via an in-car navigation device, such as a PND or integrated device, or may be provided as an input to an Advanced Driver Assistance System (ADAS). Traffic information may also be used for route planning, e.g. by a navigation device or ADAS, before commencing a journey, or to recalculate a fastest route during a journey if conditions change en route. The information has conventionally been based on messages sent over an FM radio network via the Traffic Message Channel (TMC), which may be received by navigation devices and conveyed to a user, or otherwise used by an ADAS or navigation system. A typical TMC message would include information identifying a geographic location, type and direction of an incident according to certain standard codes.

More recently other traffic information systems have been developed, such as the "HD Traffic™" system developed by TomTom International B.V., which relies at least in part upon other sources of traffic information. For example, the HD Traffic system is based upon so-called "probe" data, obtained from mobile phones, PNDs and other devices having positioning capability located in vehicles, which can be used to identify locations and speeds of vehicle, and thus indicate traffic conditions. However the HD Traffic system typically still uses TMC or similar third party traffic messages in conjunction with data obtained from analysing movements of probe vehicles.

The Applicant has realised that while the above systems have improved the accuracy with which traffic information can be provided, there remains scope for improvement in methods and systems for providing traffic information to users and/or navigation devices or ADAS, in particular which rely at least in part upon traffic messages, e.g. from third party providers or other sources. For example, TMC or similar messages are often inaccurate, e.g. in terms of identifying a location or extent of the problem, and may not be up to date.

SUMMARY OF THE INVENTION

In accordance with a first aspect of the invention there is provided a method of verifying and/or improving a message indicative of an event affecting traffic flow on at least a portion of one or more navigable segments, the message being associated with location information indicative of the affected location, the method comprising:

obtaining positional data relating to the movement of a plurality of devices along a navigable stretch selected using the location information; and using the positional data to verify and/or improve the message.

In accordance with the invention, a message indicative of an event affecting traffic flow is verified and/or improved using positional data relating to the movement of a plurality of devices along a navigable stretch selected using location information indicative of an affected location from the message. The positional or "probe" data relates to the actual movement of devices and hence vehicles along the stretch, providing a way to check the accuracy of the traffic message, and, as appropriate, to refine the message.

In accordance with a further aspect of the present invention there is provided a system, optionally a server, for verifying and/or improving a message indicative of an event affecting traffic flow on at least a portion of one or more navigable segments, the message including location information indicative of the affected location, the system comprising:

means for obtaining positional data relating to the movement of a plurality of devices along a navigable stretch selected using the location information; and means for using the positional data to verify and/or improve the message.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

It will be appreciated that the steps of the method of the present invention may be performed exclusively on a server, or some on a server and the others on a navigation device in any combination, or exclusively on a navigation device. Performance of one or more of the steps on a server may be efficient and may reduce computational burden placed on a navigation device. Alternatively if one or more steps are performed on a navigation device, this may reduce any bandwidth required for network communication.

The method of the present invention may be applied to one or more messages, each being indicative of an event affecting traffic flow on at least a portion of one or more navigable segments. The present invention extends to verifying and/or improving a plurality of such messages in accordance with any of the embodiments described herein. Any references to the "message" or the "message(s)" to be verified/improved herein may refer to the, each or a message that is subjected to verification and/or improvement in accordance with the invention. The message or messages may be referred to as the "initial" message(s). Different messages may be obtained from the same or different source and may be treated in the same or different manners.

References to the verified/improved message(s) or similar herein should be understood as referring to the verified and/or improved message after undergoing verification and/or improvement in accordance with the invention.

The message to be verified is indicative of an event affecting traffic flow on at least a portion of one or more segments.

The term "navigable stretch" as used herein is defined by at least a portion of one or more navigable segments. The stretch may be made up of a part of any segment or segments, and/or may include one or more entire segments.

The navigable segment(s) referred to herein are segment(s) in an area covered by an electronic map, the map comprising a plurality of segments representing navigable segments in the area covered by the map. The or each navigable stretch (and thus navigable segment(s)) is preferably a navigable road stretch (or navigable road segment(s)), although the invention extends to any form of navigable stretch or segment.

References herein to a navigable stretch "affected by the event" should be understood as referring to a navigable stretch along which traffic flow is affected by the event. Such stretches may also be referred to as the "affected navigable stretch" for brevity. Likewise, reference may be made to the at least a portion of one or more navigable segments affected (by the event).

Embodiments of the present invention are described with reference to road segments and stretches. It should be realised that the invention may also be applicable to other navigable stretches made up of other types of segments, such as segments of a path, river, canal, cycle path, tow path, railway line, or the like. For ease of reference these are commonly referred to as a road segment or stretches.

In embodiments the method further comprises receiving the message to be verified and/or improved. The message may be received at a server. In embodiments the step of obtaining the positional data, and using the positional data to verify and/or enhance the message is carried out at a server. The method may then further comprise receiving the message at the server. The server may be a "traffic server", arranged to receive traffic messages from one or more sources, and verify and/or improve the messages to provide a verified and/or improved source of traffic data for various purposes. In preferred embodiments, the system comprises or is a server, arranged to carry out the steps of verifying and/or improving the message.

The message(s) to be verified and/or improved may be obtained from one or more sources, and preferably from a plurality of sources. By collecting messages from multiple sources and verifying and/or enhancing the messages, the invention may provide a consolidated source of higher quality data. The message is preferably a third party message. For example the message may be a Traffic Message Channel (TMC) message, or other such message received from a third party provider. The third party might be a road authority or a provider of traffic messages based on data obtained from different sources. Typically information regarding an event that may affect traffic flow, e.g. roadworks, will be sent by a road authority to a third party responsible for the dissemination of the message.

Of course, the present invention is not limited to verifying and/or improving messages received from third parties, and the method may extend to the step of generating the message indicative of an event affecting traffic flow on at least a portion of one or more navigable segments. In these embodiments, the method involves generating the message and then verifying and/or improving the message using the positional data. For example, in embodiments the method may comprise obtaining positional data relating to the movement of a plurality of devices with respect to time in an area covered by an electronic map, the map comprising a plurality of segments representing navigable segments in the area covered by the map, using the data to infer the existence of an event affecting traffic flow on at least a portion of one or more of the navigable segments, and generating a message indicative of the event. Such steps are preferably carried out by a server. The step of verifying and/or improving the message is then carried out in relation to this generated message. For example a message may be generated at a server and then subjected to the verification and/or improvement in a second stage of refinement before being transmitted, e.g. provided to users and/or navigation devices. Generation of the message and subsequent validation and/or improvement thereof may be carried out in the same or different locations. For example, these steps may be carried out by the same or different servers.

The present invention involves verifying and/or improving the initial message to provide a verified and/or improved message. The resulting verified and/or improved message may be used in various manners. If not explicitly stated, it will be understood that steps relating to the verified and/or improved message may use the message or information based thereon as appropriate. The information based on the message may be a part of the information indicated by the message or information otherwise derived therefrom. For example, the steps may involve using only part of the information contained in the verified and/or improved message.

In embodiments the method comprises transmitting the verified and/or improved message or information based thereon. This step may be carried out by a server. Preferably the message or information based thereon is transmitted to a navigation device or to an ADAS system of a vehicle. This may be carried out in any suitable manner. The navigation device may be a vehicle based navigation device, and may be a PND or integrated device.

The present invention extends to using the verified and/or improved message, or information based thereon. Thus the message may be transmitted, and information based thereon used. The step of using the verified and/or improved message, or information based thereon, is preferably carried out by a navigation device or ADAS. The navigation device may be an integrated in-vehicle navigation device or a PND.

The message or information based thereon may or may not be output to a user, e.g. driver. For example the message or information may be displayed by an ADAS or navigation device to a driver of a vehicle. In other arrangements, the information or message may be used as an input to an ADAS which may then use the information, e.g. in route planning (which may be an initial route calculation or a recalculation), without necessarily outputting the information to a user. In embodiments in which the message or information based thereon is provided to a user, e.g. driver, of the vehicle, this may be done directly or indirectly. For example, a message identifying roadworks at a given location may be used to provide an alert that such roadworks exist to the user, or may be used to enhance an electronic map being displayed to a user with the information. In other arrangements, the message or information based thereon may be output to a user via a route planning application that is not associated with a vehicle e.g. a web based application.

In some embodiments the method comprises using the message or information based on the message to enhance an electronic map. The map is enhanced with information relating to the event. The map may be enhanced with information indicative of one or more of a geographic location of the event, spatial extent and/or geographic location of a navigable stretch affected by the event, severity and type of the event affecting traffic flow and/or an information indicative of an expected speed of travel along the affected stretch. Enhancement of a map may be carried out by a navigation device or even ADAS, or may be carried out by a server, to enhance a web based electronic map indicating events affecting traffic flow on segments provided by a route planning system. Thus the map may be a map displayed by a navigation device, ADAS or display associated with any route planning device.

In some embodiments, the message or information based thereon is used to provide a lane level view of a path along a navigable stretch affected by the event.

In preferred embodiments, the message or information based thereon is used in the generation of a route. This may be carried out by a navigation device, route planning apparatus, whether associated with a vehicle or not, or an ADAS system. For example, the information may be used to generate a route, or new route, avoiding the stretch affected by the event. While the present invention is particularly useful in the context of providing information regarding an event which may affect travel in a navigation context, e.g. during navigation along a given route, the invention is also applicable to route planning systems, which may not include navigation functionality. For example these may be systems which are used by a user to plan a route at home before setting out, etc. Such systems may be implemented via a laptop, desktop or other computing device, or a mobile phone, etc. In some embodiments the message or information based thereon is used in the generation of a route via a web based route planning system.

In some embodiments the message or information based thereon is used in the estimation of a travel time along a route. For example, the message may include an indication of the expected travel time along the affected stretch which can provide more accurate estimates of travel time or time of arrival.

In some embodiments the message or information based thereon is used to provide a warning or alert regarding the event to a driver. This may be issued via a navigation device, ADAS or could be in the form of an email alert or similar, relating to a route planned via a route planning application.

In embodiments using an ADAS, the message or information based thereon may be used as an input to any function of the system, e.g. to an automatic lane assistance and/or cruise control function of the system and/or to select a driving mode. The message provides information regarding traffic conditions which can be used to determine the path through the affected stretch, or may be used to trigger functions to return the mental awareness of the driver back to the task of driving, e.g. due to an expected increase in mental workload.

Thus, in accordance with the invention, the method may comprise using the verified and/or improved message or information based thereon to enhance an electronic map, to provide a warning or alert to a driver, to determine an expected arrival time, to determine an expected timing for a route, and/or to generate a route and/or as an input to an ADAS. Any of these steps may be implemented using a vehicle based navigation device, e.g. PND or integrated device, ADAS or, where navigation functionality is not required, any suitable, e.g. web based route planning application.

Alternatively or additionally, in embodiments the method may comprise storing data indicative of the verified and/or improved message. The data may simply be the message, or may be in any manner indicative thereof, e.g. a pointer thereto, etc. Preferably such a step is carried out by a server. The data indicative of the message may be stored in a database of verified and/or improved messages. Such a database could provide a body of higher quality messages which could then be provided to third parties, even the same third parties from whom the original messages were obtained, as "refined" messages. The messages may then be disseminated via usual channels as higher quality data. The messages may alternatively or additionally be used for other purposes by a third party, e.g. as a form of quality control of the original messages provided by the party, or another party. In other applications, the verified and/or improved message may be compared to the original message, i.e. prior to validation and/or improvement in accordance with the invention. This may be carried out as part of a quality control process for the original messages, or to allocate the message a quality measure, which for example could be used in pricing data obtained from that source, etc. Thus a message may be stored and may or may not then immediately be transmitted or otherwise used.

In a further embodiment the method further comprises storing the verified and/or improved message in a verified and/or improved message database. The present invention extends to a database of messages that have been verified and/or improved in accordance with the invention in any of its embodiments.

In accordance with a further aspect of the invention there is provided a database of verified and/or improved traffic messages, wherein each message has been obtained by a method in accordance with the present invention (as descried herein).

The present invention in these further aspects may include any or all of the features described in relation to the other aspects and embodiments of the invention.

In accordance with the invention in any of its aspects or embodiments, the event affecting traffic flow may be of any type that may affect traffic flow along at least a portion of one or more navigable segments. In preferred embodiments the event is roadworks, a lane closure, or a road closure. However, other exemplary events may include a bottleneck (arising for any reason), or a lane restriction. It will be appreciated that numerous possible events exist which may affect traffic flow along at least a portion of one or more navigable segments, and in relation to which a message for verification and/or improvement may be provided. Various factors may affect traffic flow. Some of these factors are transient, such as rush hours, breakdowns, accidents, etc which can affect traffic flow over the shorter term. The present invention is most applicable to events which, while being temporary, may have a longer lasting impact on traffic flow. Such events might include roadworks, lane closures, road closures, etc, which may last for at least a day or so. This is because the present invention relies upon using positional data relating to the movement of devices, i.e. associated with vehicles along the navigable stretch selected using the location information of the message, in order to verify and/or improve the message. It will be appreciated that validation and/or improvement of a message will rely upon a meaningful volume of this "probe" data being obtained to permit validation or improvement to a desired degree of accuracy. While, in general, this means that the methods of the present invention are most applicable to events which affect traffic flow over at least a 24 hour period, depending upon traffic flow and hence levels of probe data which may be collected, shorter or longer time periods may be appropriate to different events. For example, where an event affects a navigable stretch at night only, a longer duration may be required to collect a useful body of probe data. Where traffic volumes are high, useful volumes of probe data may be collected in a matter of hours. In embodiments therefore, the event is a temporary event. The event may have a duration of at least 24 hours.

In accordance with the invention, the message to be verified and/or improved is associated with location information indicative of an affected location. The affected location is a location in which traffic flow is affected by the event. The location information may be indicative of a point location or more preferably an extended location. In embodiments the location information is indicative of a location of the event and/or identifies an initial navigable stretch on which traffic flow is considered to be affected by the event. For example, the message might simply state that roadworks are present at a given intersection, without necessarily specifying a stretch where traffic flow is affected. In other arrangements, the message might identify a stretch of road affected by the roadworks, e.g. from junction x to junction y of a motorway. In any event, such information is generally imprecise, and can be considered to provide "coarse" location information, which is preferably subjected to refinement in accordance with the invention. The location information is used to select the navigable stretch in relation to which positional data is obtained. In other words, it is used to determined the navigable stretch in respect of which positional data is analysed to improve or verify the message.

In accordance with the invention, the method involves obtaining and using positional data relating to movement of a plurality of devices along a navigable stretch selected using the location information associated with the message to verify and/or improve the message. Preferably the positional data is indicative of the position of the devices with respect to time. In other words, the positional data is preferably associated with time data.

The positional data may be positional data that is not necessarily received specifically for the purposes of the present invention. For example, the data may be data obtained from an existing database of such "probe" data, from which the relevant data may be filtered out. In some arrangements the step of obtaining the data may comprise accessing the data i.e. the data being previously received and stored. The step of obtaining the positional data preferably, however, comprises obtaining e.g. receiving the data from the devices. This enables the use of "live" data rather than historic data, as discussed below. Preferably the received data is positional data and associated time data. In arrangements in which the method involves obtaining or receiving the data from the devices, it is envisaged that the method may further comprise storing the received positional data before proceeding to carry out the other steps of the present invention. However, in preferred embodiments, delay is minimised, in order to ensure that messages are improved in a manner which results in their being as up to date as possible. Preferably the data is collected in response to the message to be verified and/or improved. In other words, the data is collected specifically in relation to the selected navigable stretch for the purposes of verifying and/or improving a message.

In embodiments the positional data is in the form of a plurality of positional or probe traces, each representing the position of a device at different times.

In embodiments the positional data, and preferably associated timing data, is received at a server. For example, the server may be a server of a navigation system associated with a plurality of devices e.g. navigation devices used to provide positional data.

Preferably the positional data relates to the movement of the devices with respect to time, and may be used to provide a positional "trace" of the path taken by the device. As mentioned above, the data may be received from the devices or may first be stored. The devices may be any mobile devices that are capable of providing the positional data and sufficient associated timing data for the purposes of the present invention. The device may be any device having position determining capability. Typically the device may comprise a GPS or GSM device. Such devices may include navigation devices, mobile telecommunications devices with positioning capability, position sensors, etc. The device is preferably associated with a vehicle. In these embodiments the position of the device will correspond to the position of the vehicle. The device may be integrated with the vehicle, e.g. in-built sensor or navigation apparatus, or may be a separate device associated with the vehicle such as a portable navigation apparatus. Of course, the positional data may be obtained from a combination of different devices, or a single type of device e.g. devices associated with vehicles.

It will be appreciated that the positional data obtained from the plurality of devices, may be referred to as "probe data". The data obtained from devices associated with e.g. vehicles may be referred to as vehicle probe data. References to probe data herein should therefore be understood as being interchangeable with the term "positional data", and the positional data may be referred to as probe data for brevity herein. In this method a plurality of time-stamped position data is preferably captured/uploaded from a plurality of devices having positioning capability e.g. navigation devices, such as portable navigation devices (PNDs). While in preferred embodiments, time data is provided with the positional data by devices, it is envisaged that timing data could be separately determined and associated with received positional data.

In preferred embodiments the method comprises obtaining, preferably receiving, positional data relating to the movement of a plurality of devices in an area of an electronic map, the map comprising a plurality of segments representing navigable segments in the area covered by the map, and, for the selected navigable stretch (which is defined by at least a portion of one or more navigable segments), filtering the positional data to obtain positional data relating to the movement of devices along the navigable stretch.

In accordance with the invention, the data used to verify and/or improve the message is positional data relating to the movement of devices along a navigable stretch selected using the location information associated with the initial message. As mentioned above, the location information identifies an affected location, which may be a location of the event and/or a navigable stretch where traffic flow is considered to be affected by the event. This enables the navigable stretch in relation to which positional data is obtained to be selected appropriately. In embodiments the navigable stretch selected includes an event location and/or navigable stretch identified by the location information. For the avoidance of doubt, references to the "initial navigable stretch" herein refer to a stretch identified in the initial message to be verified and/or improved, while references to the "selected navigable stretch" refer to the stretch selected using the location information associated with the initial message, and in relation to which positional data is determined.

In preferred embodiments in which the location information identifies an initial navigable stretch on which traffic flow is considered to be affected by the event, the selected navigable stretch includes, and is preferably longer than the initial navigable stretch. Thus the selected navigable stretch includes the initial navigable stretch and preferably a portion extending beyond one or preferably both ends thereof. The portion(s) extending beyond the end(s) of the initial stretch are preferably contiguous with the end(s). For example, the selected navigable stretch may be provided by extending an initial navigable stretch identified by the location information by a predetermined distance on one or both ends thereof, e.g. by 2 km. This may allow information regarding a geographic location or spatial extent of the stretch where traffic flow is affected by the event to be verified and, if appropriate, refined, using the positional data, in cases where the original message indicated an inaccurate location or spatial extent. The positional data allows accurate determination of a stretch that is actually affected. Of course, in other arrangements the selected stretch could correspond to the initial navigable stretch.

Preferably the positional data obtained and used in verifying and/or improving the message is "live" positional data. Live data may be thought of as data which is relatively current and provides an indication of what is occurring on the navigable stretch. Thus, the data may be "pseudo-live", in that it may not relate to exactly current conditions, but is "live" by contrast to "historical" data. The live data may typically relate to the movement of devices on the selected navigable stretch within the last 30 minutes. In some embodiments the live data may relate to the movement of vehicles on the selected navigable stretch within the last 15 minutes, 10 minutes or 5 minutes. Preferably historical data is not used in verifying and/or improving the message. In embodiments the verifying and/or improving the message is carried out without reference to historical profiles, e.g. speed profiles for the selected navigable stretch or the segment(s) defining the stretch.

In some embodiments the live data comprises one or more live travel speeds along the selected navigable stretch. The live travel speed may typically be calculated from GPS probes. This data may be relevant as it may provide an up to date indication of the actual situation on a stretch. In addition to the probe data, other sources of data may be used to obtain live data relating to travel along a stretch, including: data from cellular telephone networks; road loop generated data; and data from traffic cameras (including ANPR—Automatic Number Plate Recognition). Typically the data will be by reference to the segment(s) making up the stretch.

In preferred embodiments the message to be improved/verified contains at least information identifying a navigable stretch along which traffic flow is considered to be affected by the event (the "initial" navigable stretch). The identification of the initial navigable stretch provides information regarding a geographic location, and, in embodiments, a spatial extent thereof. The information may identify a start point and end point of the affected stretch. The identification of the initial navigable stretch may be by reference to a set of geographic coordinates or any suitable reference system. The message may alternatively or additionally comprise information indicative of a geographic location of the event. This location information provided in the message may be considered to be "coarse" information which may be subjected to validation and/or improvement in accordance with the invention. For example, it has been found that, in particular, information regarding a spatial extent of the region where traffic flow is affected may be inaccurate, or at least imprecise, in third party reports, and it is particularly useful to refine or provide such information. For example, a report may refer to traffic flow being affected by roadworks between junctions x and y of a given motorway. In practice, the stretch where travel speeds are actually affected may be considerably shorter. Furthermore, where an event is longer term, the precise stretch affected may change over time, as different stages of construction are reached. A traffic message may continue to just specify the overall stretch between the junctions for the entire duration of the works, giving little indication of the precise length and duration of the stretch actually affected at any given time.

The message to be improved/verified may contain information indicative of a severity of impact of the event upon traffic flow. This may be in terms of a level of disruption on a qualitative or quantitative scale, which may be in relative or in absolute terms, e.g. in terms of a predicted speed or time of travel along an affected stretch.

In embodiments the message to be improved/verified may contain information indicative of a type of event, e.g. roadworks, road closure, lane closure.

The step of verifying and/or improving the message may involve carrying out such steps in relation to any part or parts, or the entire content of the message.

The obtained positional data may be used in any suitable manner to verify and/or improve the message. This may involve any combination of verifying, improving or providing further information relating to the event and/or its effect on traffic flow. The use of positional data, preferably live data, obtained from devices travelling along the selected navigable stretch, provides a way of at least double checking that the data is correct, and reflects actual conditions, and may allow additional information to be obtained to refine the message. For example, as mentioned above, some events, e.g. roadworks. may last for several months, and may be "mobile", such that their location changes over time. In such situations, it is important to verify that the information provided in the original message is still relevant, and, if appropriate, to update or refine that information.

In preferred embodiments the method comprises using the positional data to verify, improve and/or provide information relating to one or both of a geographic location of the event and the identification, preferably a spatial extent, of a navigable stretch along which traffic flow is affected by the event. For example, where no information indicative of an affected stretch is given, the present invention may, in providing such information, improve the original message.

Alternatively and/or additionally, the method comprises using the positional data to verify, improve and/or provide information relating to an expected speed or time of travel through a navigable stretch on which traffic flow is affected by the event.

Alternatively and/or additionally, the method comprises using the positional data to verify, improve and/or provide information regarding an expected path of travel through a navigable stretch affected by the event, preferably a lane level path. For example, some roadworks may necessitate a deviation in the usual lane courses, e.g. such that vehicles can only travel along certain lanes, or are forced to utilize the hard shoulder. Such information may be used to enhance a lane level view of an electronic map indicating a path to be taken through the affected stretch.

Alternatively and/or additionally, the method may comprise using the positional data to verify, improve and/or provide information regarding a severity of the impact of the event upon traffic flow. For example, a message may indicate that an event is having a moderate impact upon traffic flow, but, positional data may reveal that the event is having no significant impact upon travel on the selected navigable stretch, i.e. such that speed of travel is not significantly affected. This may result in the message being discounted, i.e. found to be invalid, if the impact is below a given threshold. A message invalidated in this manner will then not be used further, e.g. may not be stored in a database of "refined" data, or used in route planning or otherwise provided to a navigation device or driver. Conversely, where an event is found to be having a significant enough effect upon traffic flow in an area to warrant validation of the message, the message may simply be marked as "valid", or may be further improved, e.g. to refine a level of severity allocated to the event, etc.

In any embodiment data obtained to improve or verify the message may be associated with the message, e.g. stored in association therewith. The data may supplement or replace existing data indicated by the original message.

In preferred embodiments the positional data is used to obtain data indicative of the speed of travel of the devices along the selected navigable stretch ("speed data"), and the step of verifying and/or improving the message uses the speed data. Techniques for using positional or "probe" data to obtain data indicative of a speed of travel are well established. For example, WO 2009/053411 A1 describes methods for obtaining average speed data from probe data; the entire contents of which is incorporated herein by reference. Any of the steps of verifying and/or improving a message outlined above may use speed data in accordance with any of the embodiments set out below.

In preferred embodiments data indicative of the speed of travel of devices along the selected navigable stretch is obtained with respect to a plurality of positions along the navigable stretch. This may allow a more precise start and end point of an affected stretch to be identified. In some embodiments the method comprises obtaining a profile representative of the data indicative of the speed of travel of devices along the selected navigable stretch with respect to distance along the selected navigable stretch, and using the profile in the verification and/or improvement of the message. Such a profile may be referred to as a "spatial speed profile". The profile may be a continuous profile. A continuous profile may effectively provide data with respect to a plurality of continuous positions, by virtue of interpolating between actual measured positions.

Consideration of the speed of travel along the selected navigable stretch may be used to determine more precisely the location and severity of any impact on traffic flow. The speed data used herein may be in any manner indicative of speed, and might be a travel time along the selected stretch or part thereof rather than an actual speed. The data indicative of the speed of travel is preferably based on data indicative of a speed distribution profile for the selected navigable stretch. In preferred embodiments in which speed data in respect of a plurality of positions along the selected navigable stretch is used, speed data based on a speed distribution for each position is obtained and used. An average speed might be used. In accordance with the invention, however, preferably the speed data (for the or each position) is, or is based on, a percentile speed. The percentile speed is a speed which may be indicated by speed distribution profile data. The percentile speed is preferably a percentile speed that is higher than the median i.e. higher than a 50th percentile speed. It has been found that by using a higher speed percentile, i.e. xth percentile for a road segment, the speed data will reflect the driving speed of a fastest (100−x) % of the vehicles travelling along the stretch. The speed of these relatively fastest vehicles may provide a suitable indicator for detecting speed reductions caused by an event affecting traffic flow on the stretch. Preferably the percentile speed is a 70th percentile speed of higher, or a 75th percentile speed or higher. In some embodiments an 85th or higher percentile speed, such as a 90th percentile or higher speed, is used. The level of the percentile speed used may depend upon which aspect of a message is to be verified or improved, as will become apparent from the discussion below. Thus, in these embodiments, preferably data is obtained indicative of a percentile speed of devices for each of a plurality of positions along the selected navigable stretch.

Some preferred ways in which the speed data, and preferably percentile speed data, or other data obtained from a speed distribution, with respect to position along the selected navigable stretch, may be used to verify and/or improve the message will be described. It will be appreciated, that if not explicitly stated, and unless the context demands otherwise, any reference below to speed data may refer to speed data of any of the forms above, and preferably to speed data based upon a speed distribution, e.g. percentile speed data, and most preferably in respect of a percentile above the median.

The speed data may be used to determine the validity of the message, i.e. to verify the message or otherwise. In embodiments, the method of determining the validity of the message, comprises comparing data indicative of a speed of travel, preferably a percentile speed, obtained from the positional data, preferably for each of a plurality of different positions along the selected navigable stretch, with a threshold speed. A determination of the validity or otherwise of the message may be based upon the speed data and the threshold in any manner. In embodiments, the method comprises determining that the message is not valid when the speed data is indicative of a speed, preferably a percentile speed above the threshold, or a given amount above the threshold, preferably for each of a plurality of positions. The method may comprise determining that the message is valid when the speed data is indicative of a speed, preferably a percentile speed below the threshold, or a given amount below the threshold, preferably for each of the plurality of positions. Of course, determination of the validity may include additional steps, and may be based upon speeds being found to be above or below a threshold, or above or below a given margin relative to the threshold at a given position, or over a given distance of travel along the selected navigable stretch. In some arrangements a determination of validity may be made on the basis of this and further tests. In these preferred embodiments, the percentile speed is preferably a percentile speed above the median, such as a 75th or higher, 85th or higher, e.g. 90th percentile speed.

In this way, when it is found that the relatively fastest vehicles traveled along the selected navigable stretch at high speeds, above the threshold speed, then it can be derived that the event has no significant effect on traffic speed, and the message is not valid. Conversely, if the fastest vehicles traveled below the threshold speed, then, in embodiments, the message is verified, as it can be determined that an event exists having an effect on the normally expected traffic flow along the selected navigable stretch.

In these embodiments, speed data is preferably considered for a substantially continuous set of positions along the selected navigable stretch. In embodiments the method involves obtaining a profile representing the percentile speed with respect to distance along the selected navigable stretch, and determining whether the profile falls below a threshold speed, or a predetermined amount below the threshold, at any given position along the selected navigable stretch. A determination of the validity of or otherwise of the message may be based upon the profile falling below the threshold for a distance greater than a given length.

In any embodiments using a threshold speed, the threshold speed may be selected as appropriate, so as to enable verification or otherwise of a message. The threshold speed may be based on an expected speed of travel along the selected navigable stretch. Preferably the threshold speed is based on historical data, e.g. an average speed or speed profile data, for the selected navigable stretch. This may be based on the corresponding data for the segment or segments defining the stretch. Historical speed profiles are typically aggregated over relatively long timescales, such that they will not be affected by temporary factors affecting traffic flow, e.g. roadworks.

The speed data may alternatively or additionally be used to determine a severity of the effect of an event on traffic flow.

This may be used to verify corresponding data in the message, or to improve the message by adding severity data. Such embodiments may be implemented in a similar manner to the verification of messages as described above, but additionally considering a magnitude, or relative magnitude, of the impact of the event upon traffic flow. In embodiments the method comprises using data indicative of the speeds of travel of devices along the selected navigable stretch to determine a severity of the effect of the event upon traffic flow. The speed of travel is preferably based upon a speed distribution representative of the speeds traveled by different devices at a position or positions along the selected navigable stretch, and most preferably is indicative of a percentile speed. The severity of the effect may be determined in any manner. In embodiments the severity may be assessed by comparison of a speed of travel indicated by the speed data, preferably a percentile speed, for one or more positions along the selected navigable stretch with a threshold speed. The threshold speed may be obtained as set out above, e.g. being based upon a historic speed. The severity may be based upon a difference between the speed of travel indicated by the speed data and the threshold speed. The severity data may be in quantitative or qualitative terms. For example, a difference between the speed of travel and a threshold speed may be correlated with a severity level or importance level using an appropriate scale. In embodiments, the method may further comprise associating severity data with the message.

One area in which the use of the positional data is particularly useful, is in identifying a navigable stretch along which traffic flow is actually affected by the event. Data regarding the navigable stretch determined to be actually affected according to the positional data ("the actually affected stretch"), may be obtained and associated with the message, or may be used to refine any corresponding data, e.g. the identification of an initial stretch already associated with the message, e.g. a spatial extent and/or location of the stretch. In preferred embodiments the step of identifying the affected navigable stretch comprises determining a spatial extent and/or geographic location of the affected stretch. The spatial extent refers to the length of the stretch.

In preferred embodiments the method further comprises using the positional data or preferably speed data relating to the movement of devices along the selected navigable stretch to identify a navigable stretch along which traffic flow is affected by the event according to the positional, e.g. speed, data. Although speed data is preferably used, other types of positional data may be used to determine the affected area. Preferably the method comprises determining a spatial extent and/or geographic location of the stretch. Preferably the method involves determining data indicative of a start position and end position of the affected stretch in the direction of travel. The method may comprise improving the message by associating the message with information indicative of the stretch, and preferably the spatial extent and/or location of the stretch determined to be affected.

As mentioned above, the selected navigable stretch used in the step of verifying and/or improving the message and is selected using the location information associated with the initial message. In some embodiments in which the location information is indicative of an initial navigable stretch along which traffic flow is considered to be affected by the event, the selected stretch includes the initial navigable stretch, but preferably includes a further stretch at one or both ends of the initial stretch. This means that the stretch determined to actually be affected identified by consideration of the positional data may extend beyond an end or ends of the initial stretch originally identified. In embodiments the navigable stretch determined to be affected by the event on the basis of the positional data differs from the initial stretch, and in embodiments is shorter than the initial navigable stretch. The stretch determined to be affected may or may not overlap with the initial stretch. In some embodiments the stretch determined to be affected is a portion of the initial stretch. The present invention thus allows the true extent of the affected stretch to be identified based on data relating to actual movements in the relevant area. The stretch determined to actually be affected is typically shorter than the selected navigable stretch in relation to which positional data is obtained.

Preferably the step of identifying the navigable stretch affected by the event according to the positional data, and most preferably determining a spatial extent and/or geographic position thereof, is carried out by reference to a profile representing a speed of travel of the devices with respect to position along the selected navigable stretch. The speed of travel is preferably based on a speed distribution, and most preferably is a percentile speed. In particularly preferred embodiments the data indicative of the actually affected stretch is determined using a profile representing a speed of travel of devices along the selected navigable stretch with respect to position along the selected navigable stretch.

In embodiments in which a navigable stretch determined to be affected is identified on the basis of the positional data ("the actually affected stretch"), whether in connection with determining a spatial extent of the stretch or not, the affected stretch may be identified by reference to a relative change in the speed of travel with respect to position along the selected navigable stretch and/or by reference to a speed threshold. The threshold speed may be an absolute or relative threshold. For example, the threshold speed may be indicative of an "expected" speed of travel along the selected navigable stretch, e.g. being based upon historical data, such that a drop in speed below the expected threshold, or a given amount below the threshold may be taken as indicative of the start of the actually affected stretch, with a return to the expected speed, or to a speed within a given margin thereof, being taken as the end of the actually affected stretch. In other embodiments, the extent of the actually affected stretch may be determined without reference to any absolute threshold, and may be carried out by reference only to the speed data with respect to position itself. For example, a drop in the speed of greater than a given magnitude along the selected stretch, i.e. greater than a given relative threshold, may be considered indicative of the start of the actually affected stretch. The end of the actually affected stretch may be indicated by a return to the previous speed, or an increase in speed greater than a given relative threshold. It will be appreciated that numerous tests may be carried out to identify the extent of the actually affected stretch along such lines or otherwise. Of course, more than one actually affected stretch may be identified. For example, it may be found that there are a plurality of affected regions separated by an unaffected region along the length of the selected stretch. Once the affected stretch is identified, its spatial extent and/or the geographic location thereof may be determined.

In embodiments in which the actually affected navigable stretch is identified using positional data, whether using speed data or otherwise, suitable location information indicative thereof may be associated with the message. Preferably the data is indicative of both a length and a position of the stretch. This may be by reference to coordinates, and may used a map agnostic location referencing system, such as the OpenLR™ system described in WO2010/000706 A1 and WO 2010/066717 A1; the entire contents of both applications being incorporated herein by reference.

In embodiments in which the spatial extent of the actually affected stretch is found to differ from the spatial extent of the initial stretch along which traffic flow is affected as indicated by the message to be verified and/or improved, the method may comprise modifying the spatial extent information associated with the initial message. The modification may comprise modifying the information to indicate that a shorter, longer or otherwise different stretch of road is affected. In embodiments the method comprises replacing the indication of the initial stretch with an indication of the actually affected stretch. Alternatively, a new (or replacement) message may be generated with information representative of the spatial extent of the actually affected stretch, which may then be distributed in replace of the initial message.

Verification or improvement of data indicative of the geographic location of the event may be carried out in a similar manner to the determination of the affected stretch using speed data. For example, the geographic location may be taken as a reference point in the affected stretch, e.g. a start point, or a point of greatest impact etc.

In some preferred embodiments the method comprises using the positional data to obtain data indicative of an expected speed or speeds of travel along a navigable stretch where traffic flow is affected (e.g. determined to be affected on the basis of the positional data), and associating the expected speed data with the message. In these preferred embodiments the method comprises verifying and/or improving the message by associating the speed data with the message. Of course, if such data is already associated with the message, then the data may be used to verify, or improve the message, to the extent the original data may not be accurate. In these embodiments the stretch where traffic flow is affected may be determined using the positional data. Thus, in these embodiments, the method further comprises determining a stretch that is affected using the positional data. This may be carried out as part of a step of determining the spatial extent of the stretch, although it is not necessary to carry out such a determination. For example, a region where a drop in speed exists on the selected stretch may be taken as the affected region, and an expected speed value obtained therefor, without necessarily precisely determining the ends of the region.

In preferred embodiments in which the positional data is used to obtain speed data indicative of the speed of travel of devices along the selected navigable stretch, preferably the method comprises using the speed data to provide the expected speed data. For example, the speed data may be used as the expected speed data, or the expected speed data may be otherwise based thereon. Preferably the expected speed data is based upon a speed distribution obtained using the positional data for the selected navigable stretch, and is most preferably is based on a percentile speed. The percentile speed is preferably higher than a median speed, and may be a 70th or 75th percentile or higher speed. However, the percentile speed may be lower than that used in assessing the validity or severity of the event, in order to be more representative of typical, rather than fastest, travel speeds. The expected speed data may be indicative of a speed of travel at any position or positions along the selected navigable stretch where traffic flow is considered to be affected by traffic, e.g. where the speed has fallen below a given threshold, or falls relative to other positions along the stretch, etc. In embodiments the expected speed data is indicative of a speed of travel along the navigable stretch where traffic is actually found to be affected based on the positional data. This may be determined as described above. In preferred embodiments in which speed data is obtained using the positional data in respect of different positions along the selected navigable stretch, a suitable expected speed or speeds may be determined as representative of the speed of travel through the affected region, e.g. through the actually affected stretch where determined. The expected speed data may be based on a single speed value per stretch obtained using the speed data for different positions along the stretch, or may be indicative of a plurality of different speeds based on the speeds obtained for different positions.

Associating data indicative of the expected speed of travel through an affected stretch, e.g. an actually affected stretch determined based on the positional data, being based on actual positional data in accordance with the invention, provides a more accurate reflection of current driving speeds in the affected stretch, enabling more accurate estimated journey times for routes to be obtained.

Various embodiments have been described in which the positional data is used to obtain speed data which is used in verifying and/or improving the message. However, the positional data may be used in other manners. For example, events such as roadworks may involve some change to the normal path through a region, e.g. due to lane closures or temporary redirection of lanes, etc. Thus, in one embodiment the positional data is used to determine an expected path of travel along a stretch affected by the event (as determined using the positional data). Preferably the path is a lane level path. The method may further comprise displaying such a path as discussed above. These embodiments may also provide a way of identifying, or confirming an identification of, the actually affected stretch.

Any of the methods in accordance with the present invention may be implemented at least partially using software e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Where not explicitly stated herein, references to "data", e.g. "speed data", should be understood as referring to any data in anyway indicative of the given parameter, e.g. speed, etc.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the invention will now be described by way of example only, and by reference to the accompanying drawings of which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide navigation functionality. It follows therefore that in the context of the present application, a navigation device is intended to include (without limitation) any type of navigation device, irrespective of whether that device is embodied as a PND, a navigation device built into a vehicle, or indeed a computing resource (such as a desktop or portable personal computer (PC), mobile telephone or portable digital assistant (PDA)) executing navigation software. In addition, the present invention is applicable to devices with the ability to obtain position data for the device, but which may not provide navigation or route planning functionality. For example, such a device could be located in a vehicle, and arranged to provide speed recommendations via an instrument panel of the vehicle, obtaining position data from the vehicle or a position determining e.g. GPS system of the device itself.

Figure 1:
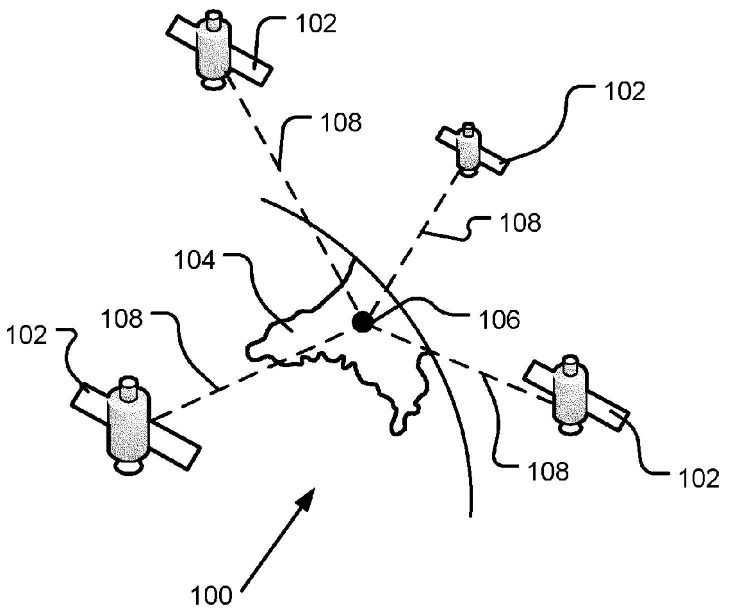
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
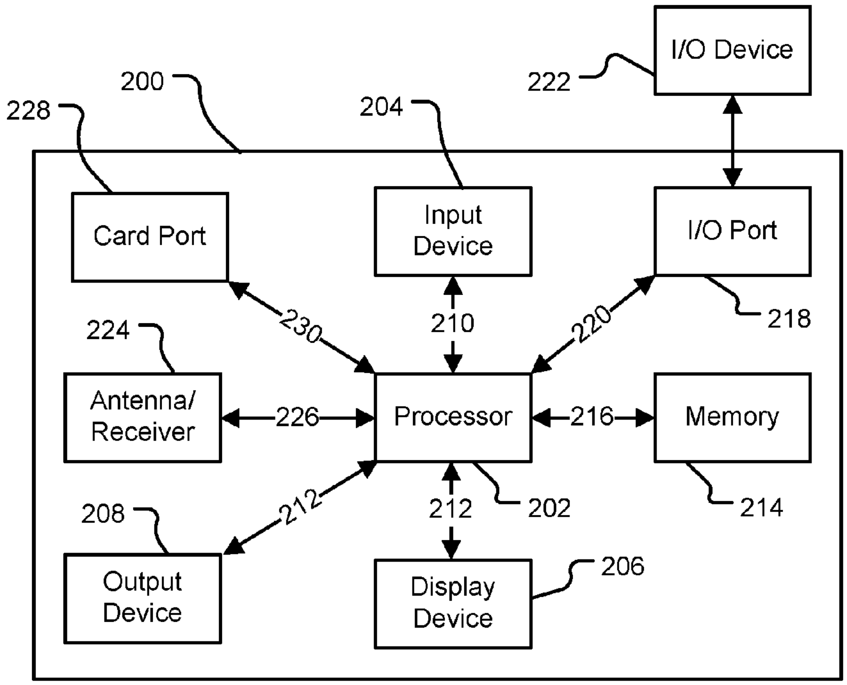
FIG. 2 is a schematic illustration of electronic components arranged to provide a navigation device.

FIG. 2 is an illustrative representation of electronic components of a navigation device 200 usable according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
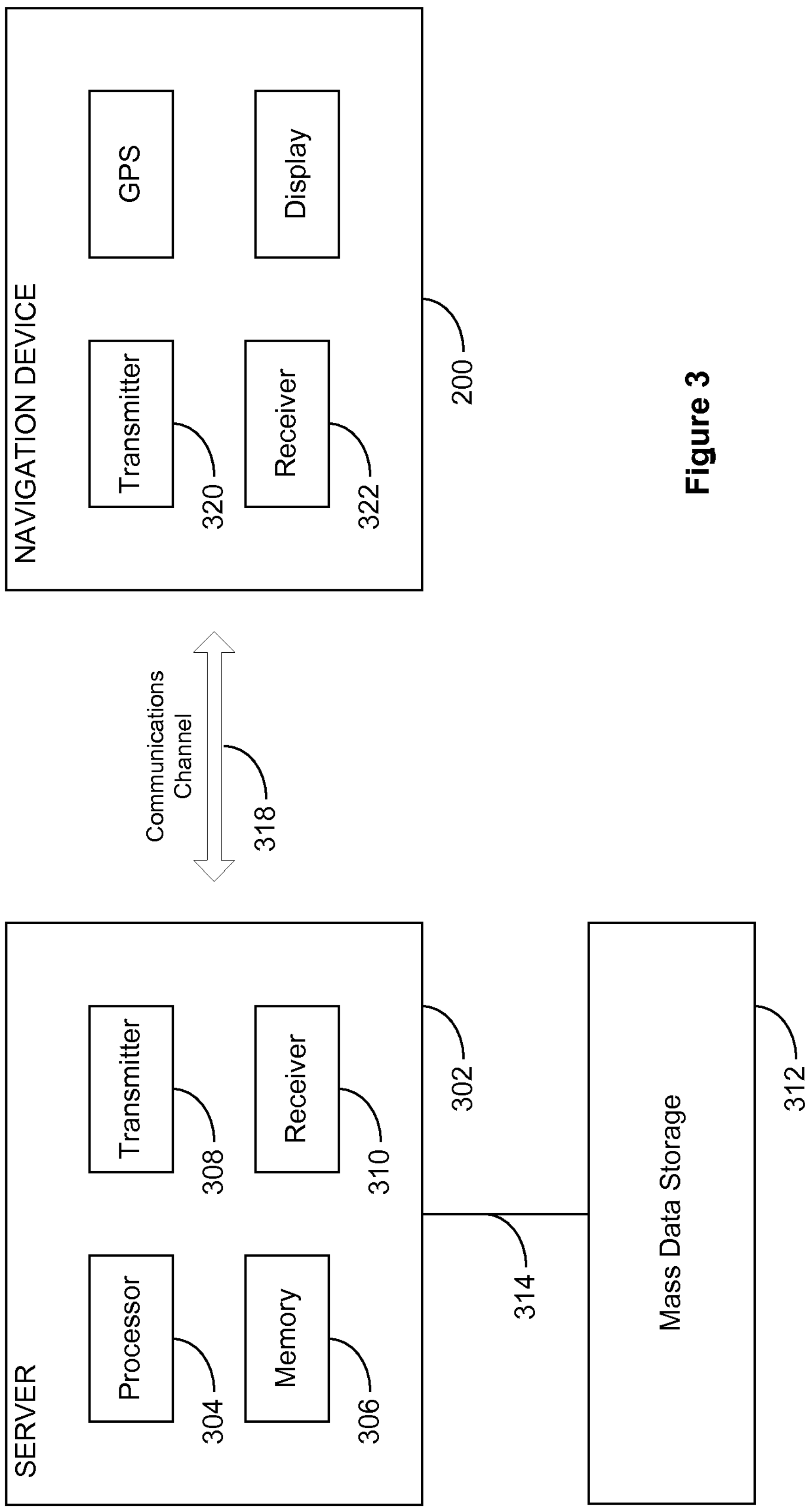
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GPRS, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
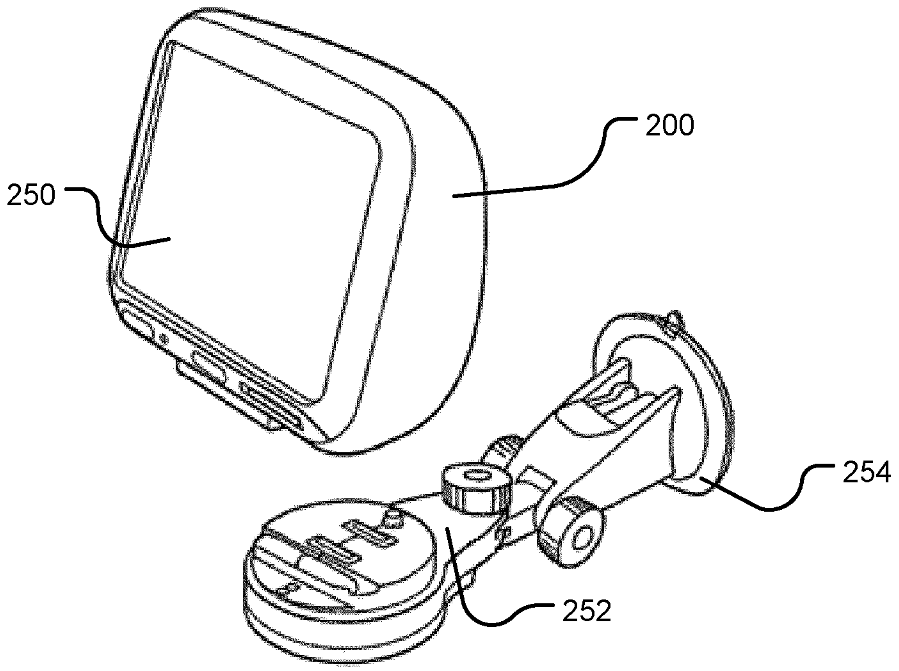
FIG. 4 is an illustrative perspective view of a navigation device.

FIG. 4 is a perspective view of a navigation device 200. As shown in FIG. 4, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked. The navigation device 200 can be docked or otherwise connected to an arm 292 of the docking station by snap connecting the navigation device 292 to the arm 292 for example. The navigation device 200 may then be rotatable on the arm 292. To release the connection between the navigation device 200 and the docking station, a button on the navigation device 200 may be pressed, for example. Other equally suitable arrangements for coupling and decoupling the navigation device to a docking station are well known to persons of ordinary skill in the art.

FIGS. 1 to 4 are provided by way of background, illustrating certain features of navigation apparatus which may be used to implement methods of the present invention.

Some preferred embodiments of the invention will now be described by reference to FIGS. 5 to 7.

Figure 5:
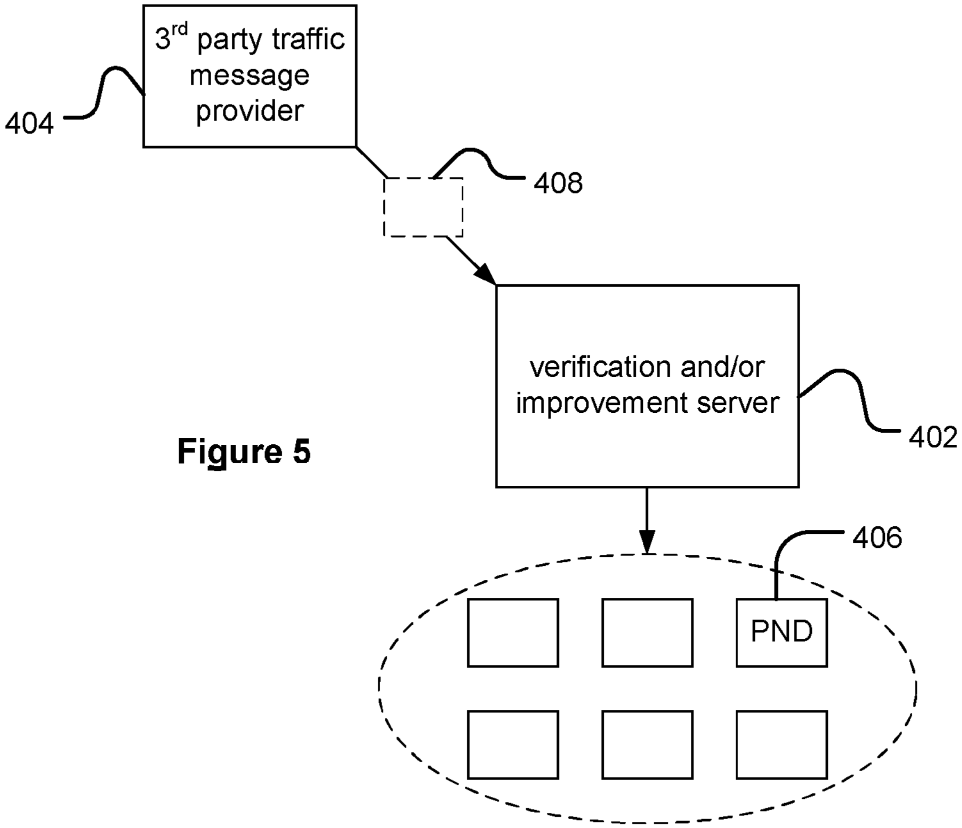
FIG. 5 is a schematic diagram of a system which may be used to implement methods in accordance with the present invention.
Figure 6:
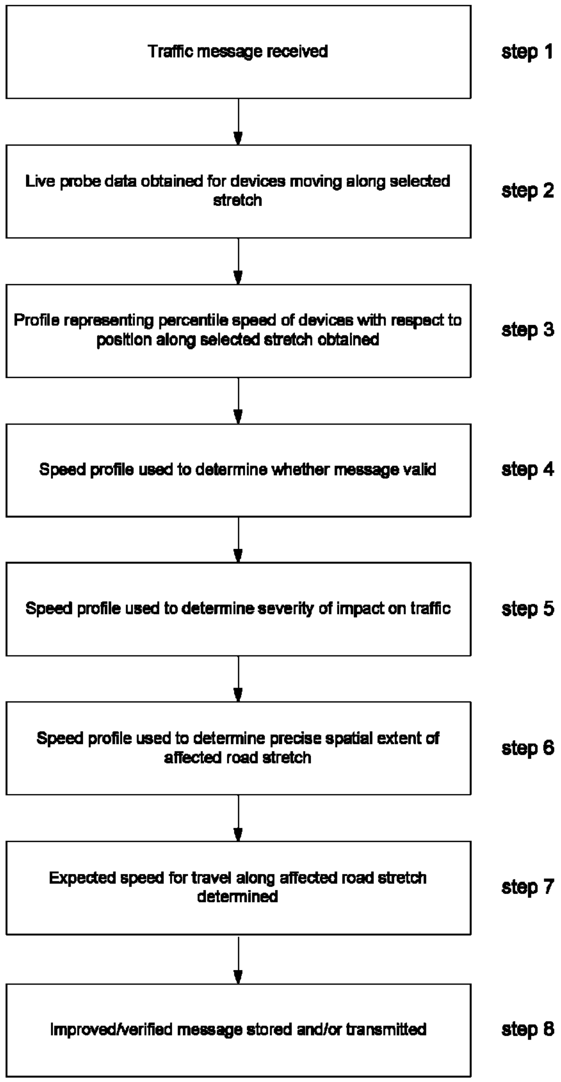
FIG. 6 is a flow chart illustrating a method in accordance with one embodiment of the invention.

FIG. 5 illustrates an exemplary system which may be used to perform methods in accordance with the invention in one embodiment. The system 400 includes a traffic message verification and/or improvement server 402, a third party traffic message provider 404 and a plurality of PNDs 406. The third party traffic message provider, e.g. server 404, is arranged to transmit traffic messages 408 indicating events, by way of example roadworks, which according to its data are having an effect on traffic flow on a first road stretch made up of at least a part of one or more road segments. These messages may be in the form of Traffic Message Channel (TMC) messages, and may be transmitted in any manner, e.g. broadcast via an FM radio network or similar, or sent using a wireless telecommunications network. Each message includes information identifying the nature of event and the location of the first affected road stretch by reference to certain standard codes. Other information may also be included.

Of course, the traffic message may be provided by a road authority or any other provider. Indeed, it may not necessarily be a third party originating message, in which case the methods of the present invention may be used to verify or further refine already generated messages. It may relate to other types of event, e.g. road closure, lane closure, etc, expected to have a temporary, although not transient, effect on traffic flow. For example, any event expected to have an effect lasting 24 hours or more is particularly applicable to the present invention.

The traffic messages 408 are received at the traffic message verification and/or improvement server 402 where they are subjected to verification and improvement in accordance with the methods described herein. Once verified and/or improved, the resulting message is stored by the server 402 in a database of verified/improved messages, and is additionally transmitted as appropriate to each of a plurality of PNDs 306. The message may alternatively or additionally be transmitted to ADAS or may be made accessible to route planning applications, e.g. via a web based system. In these cases, the messages may be provided to a server for such an application. Of course, rather than transmitting the messages themselves, any part or parts of the messages, or information otherwise based thereon may be transmitted or used.

One embodiment of the way in which verification and/or improvement of a message may be carried out by the server 402 will now be described by reference to FIG. 6. The reference to the server is merely exemplary, and it will be appreciated that such methods may be implemented at least in part, or exclusively by other devices e.g. navigation devices, ADAS, or any computing device having appropriately configured processors. Distributed systems may be used.

In step 1, a traffic message is received at the server, e.g. from a third party provider. The message identifies an event being roadworks said to be affecting traffic flow on a specified ("initial") road stretch.

In step 2, live probe data is obtained from devices having positioning capability e.g. PNDs located in vehicles travelling along a selected road stretch, which includes the initial road stretch specified in the traffic message, and additionally a further stretch of road of 2 km in length on either end of the initial stretch of road. The data is "live" in that it relates to travel in the preceding 15 minutes or less. The probe data is time stamped position data representing the movement of the devices, i.e. vehicles, along the segments with respect to time, and is in the form of a plurality of probe traces representing the movement of each device along the selected road stretch.

In collecting the probe data, it is necessary to obtain a sufficient quantity of data to provide statistically meaningful results. In order to provide up to date speed information based on the latest speed observations, and provide a sufficient statistical basis for calculating reliable speed quantiles, an algorithm may be used which determines that an evaluation of the data is possible when a certain number of speed observations have been collected (first threshold $t_1$; minimum of all observed road segments). If the measured speeds exceed a second threshold $t_2$ (larger than threshold $t_1$), the data collection is reset and new data is collected. The previous evaluation status is retained until sufficient observations are collected for a new evaluation. The time taken to collect a required number of speed observations will depend upon the volume of traffic over the relevant segments. For busier segments this time may be relatively short, whereas for other segments it may be relatively long where traffic is light. Given that data relating to the relevant segments must be collected and processed before traffic messages can be verified and/or improved, the time taken to collect the relevant amount of observations for a given message may in effect place a limit on the duration of event to which the invention is applicable. Short lived events, e.g. accidents, would typically not be of sufficient duration to allow the relevant data to be collected and processed for use in verifying or improving a message. Typically the invention is applicable to events lasting at least 24 hours, though still being temporary, though the duration of impact of the event could be shorter or longer depending upon how long it is likely to take to collect the necessary data. It has been found that from 300-400 speed observations, i.e. probe traces, may be sufficient.

The received data may be subjected to any appropriate processing, e.g. matching the data to the road segments making up the selected stretch of road, bundling of individual probe traces, etc, to obtain a speed distribution for each of a plurality of positions along the length of the selected road stretch. This distribution is used to obtain a profile representing a given percentile speed of the devices with respect to position along the selected road stretch—step 3. The percentile speed is, in one exemplary embodiment, a 90th percentile speed. Alternatively a 75th or 80th or 85th percentile speed, or indeed, any other suitable speed that is greater than the median may be used. The use of the 90th percentile speed, representing the speed of the fastest 10% of probes has been found to be particularly useful in reflecting the effect of roadworks, or any other traffic flow influencing event, upon speed of travel along the segments. It will be appreciated that various different percentile speed profiles may be obtained by appropriate analysis once the relevant probe data has been collected.

Figure 7:
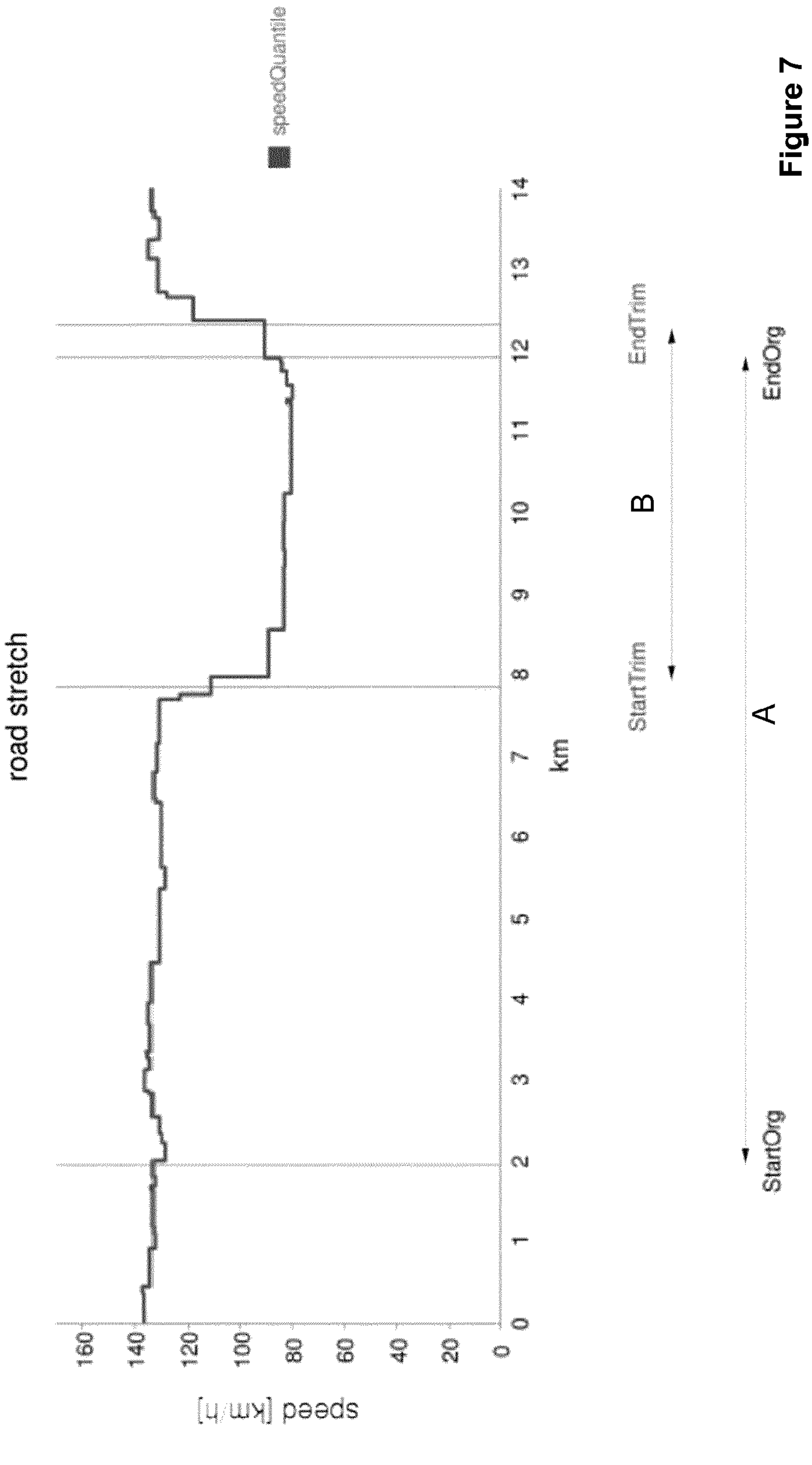
FIG. 7 illustrates a profile of speed percentile against position along a navigable segment.

FIG. 7 illustrates an exemplary profile illustrating the relevant speed quantile, in this case the 90th percentile, against longitudinal position along a selected road stretch This is the road stretch being considered for the purposes of improving the initial message, and is longer than the initial road stretch originally identified in the message.

Returning to FIG. 6, the speed profile of the type shown in FIG. 7 may be used in various manners, which may be implemented using a suitable algorithm. The speed profile may be used to determine whether the original message is valid—step 4, i.e. whether the event that it identifies does indeed give rise to any significant impact on traffic flow. For example, if the resulting speed profile for the 90th percentile speed reveals a continuously high speed over the selected stretch of road (which includes the initial stretch identified by the original message as being affected, and a 2 km stretch on either side), it can be seen that to the extent that the event might exist, it is not having any significant impact on the driving behaviour of drivers travelling along the road stretch. This may be determined by comparison of the 90th speed percentile to a threshold speed, which may be based upon a historic speed profile. A historic speed profile may be based upon an aggregation of probe traces over a relatively longer period, such that current changes in speed resulting from the relatively temporary event will not be expected to affect the profile. Thus a historic speed profile can be used to set a threshold indicative of speeds that might normally be expected. If the message is found to be invalid, it is not verified, and is not considered further. It is not added to the database of messages stored by the traffic server, and not sent out to the PNDs.

If the message is considered valid, a second test may determine the relative significance of the message, i.e. the severity of the impact of the event on traffic flow—step 5. This may be carried out by comparing the 90th percentile speed to a threshold speed based on historic speeds. A significant drop in the percentile speed below the threshold speed will indicate that the event is having a significant impact on the speed of travel along the road stretch, and the message is considered of a level of importance that it should be passed on to the PNDs, and, as appropriate, stored in a database of the traffic server. Depending upon preferences, any message found valid in step 5 may be passed on to the PNDs, or only those messages additionally passing the second test, i.e. being of a significant severity based on a threshold test.

In step 6, the speed profile (as shown in FIG. 7) is used to determine a more precise spatial extent of a road stretch in which traffic flow is affected by the event. Where the profile indicates a significant change in the percentile speed, assessed using relative and absolute thresholds, this may be indicative of the start position of the road stretch, and the end position of the road stretch. In this way, the speed data may be used to provide more precise localization of the road stretch affected by the event, or the event e.g. roadworks. The more precise spatial localization information is stored in association with the message. This will then be transmitted along with the message when sent to PNDs, i.e. improving the original message.

The formulation of a more precise spatial localization of a road stretch affected by roadworks will be described by reference to FIG. 7. In this figure, the arrow A indicates the initial road stretch indicated as being affected by roadworks in the initial message. As can be seen from the profile representing a given, e.g. 90th, speed percentile with respect to distance along the selected road stretch including the first road stretch, and additionally a 2 km road stretch on either side, the actual road stretch in which traffic flow is affected is in fact a shorter stretch, annotated B. This is the stretch in which the percentile speed experiences a drop to a lower value temporarily. Thus, the stretch of road identified in the message as being affected may be "trimmed" to correspond to this road stretch B, which can be referred to as the "actually affected road stretch", and the corresponding start and end point positions for the road stretch B included in the improved message. In this way, the affected stretch may be automatically adjusted to a stretch actually affected based upon the measured probe data. This may be particularly useful where an event, e.g. roadworks, is mobile, i.e. changes position periodically, e.g. due to different construction stages being reached. Conventional traffic messages typically do not take account of such variation in position.

In step 7, a speed indicative of an expected speed of travel along the affected road stretch is determined based on the collected probe data, and associated with the message. This is advantageously a percentile speed obtained from the speed distribution determined using the probe data. The percentile speed may be a lower percentile speed than is used when considering the validity of messages, or carrying out more precise spatial localization, e.g. a 75th percentile speed. This may provide an indication of a likely travel speed along the affected stretch based on actual driving conditions as indicated by the "live" probe data. This speed information is useful, allowing for improved estimates of journey times to be made, e.g. by a PND than would be achievable using conventional historical speed profiles. The speed information may be displayed by a PND when the message is received as an enhancement to an electronic map, e.g. in combination with the improved message.

It will be appreciated that the above gives an example of a number of improvements or verification steps that may be carried out in relation to a received traffic message. Not all of these steps need be implemented, and the order of the steps may be selected as desired. Depending upon the steps carried out, the resulting improvements are used to obtain an improved/verified traffic message, with any new data relating, e.g. to severity of event, spatial localization of the event, expected travel speed and path of travel being associated with the message thereby providing an improved and verified traffic message. In step 8 the improved/verified message is stored in the traffic server database, and is transmitted to the PNDs. The PNDs may then carry out various functions using the message. The message may be displayed or otherwise output to a driver, and information contained therein used in steps including any or all of route calculation, enhancing a displayed electronic map, estimating a journey time/time of arrival, providing a detailed view at lane level of a path to be taken through the affected road stretch, providing a warning or alert to a driver, etc.

Rather than, or in addition to be provided to a PND, the message may be provided to an ADAS of a vehicle, and information contained therein used as an input to the system. For example, this may result in the ADAS providing a warning or alert to a user, calculating a route, estimating journey time/time of arrival, or causing an electronic map displayed under the control of the ADAS to display information based on the message or a lane level view of a path to be taken through the affected stretch etc, in the same manner as discussed in relation to a PND. Of course, an ADAS may not output information based on the message to a driver, and may simply use the information contained therein in its various functions. The information may be used in lane assistance, and/or adaptive cruise control features of an ADAS, e.g. to bring back the mental focus of the driver to the task of driving, or triggering certain modes of driving depending upon the severity of the traffic situation indicated by the message.

It will be appreciated that whether conveyed using a PND or ADAS, the improvements made to traffic messages in accordance with the invention can provide an enhanced experience for the driver or user. Benefits are also obtained if the message is conveyed to a user, e.g. of a route planning application, without necessarily having navigation functionality, allowing routes to be more accurately planned taking into account the actual impact of events, e.g. roadworks.

The improved/verified messages stored by the traffic server provide a refined database of higher quality and up to date traffic messages based on messages received from a variety of sources. This provides a set of higher quality data which may be provided to third parties. It is envisaged that improved/verified messages may be compared to the initial messages upon which they are based, providing a way of assessing quality of the messages obtained from a given provider, e.g. a third party traffic message provider or road authority. This may be used in providing quality feedback or setting a pricing structure for data obtained from a given source.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of improving a message indicative of an event affecting traffic flow on at least a portion of one or more navigable segments, the method comprising:

obtaining a message with associated location information indicative of a location of an event affecting traffic flow;

using the location information to identify an initial navigable stretch comprising at least a portion of one or more navigable segments on which traffic flow is considered to be affected by the event;

obtaining positional data relating to the movement of a plurality of devices along a navigable stretch selected using the location information, wherein the navigable stretch includes at least the initial navigable stretch;

using the positional data to obtain speed data indicative of a speed of travel of the devices at a plurality of positions along the navigable stretch;

using the speed data to identify an actually affected navigable stretch comprising at least a portion of one or more navigable segments that is actually affected by the event; and modifying the message, or generating a new message indicative of the event, so as to include location information indicative of the actually affected navigable stretch.

2. The method of claim 1, wherein the message is a third party message, the method further comprising receiving the message from a third party.

3. The method of claim 1, further comprising transmitting the modified or new message, or information based thereon, to a vehicle.

4. The method of claim 1, comprising using the modified or new message, or information based thereon, to perform at least one of:

enhance an electronic map;

determine an expected timing for a route;

determine an expected arrival time;

provide a warning or alert to a driver; and generate a route.

5. The method of claim 1, wherein the event is roadworks, a lane closure, or a road closure.

6. The method of claim 1, wherein the navigable stretch includes the initial navigable segment and portions extending beyond one or more ends of the initial navigable stretch.

7. The method of claim 1, wherein the positional data is live data relating to the movement of devices along the navigable stretch, the live data being younger than a time threshold value.

8. The method of claim 1, further comprising obtaining a profile indicative of the speed of travel of devices along the navigable stretch with respect to the plurality of positions along the navigable stretch, and using the profile in identifying the actually affected navigable stretch.

9. The method of claim 1, comprising using the positional data to determine a speed distribution profile indicative of speeds of travel of the devices for each of the plurality of the positions along the navigable stretch, wherein the speed of travel of the speed data at each of the plurality of positions is a percentile speed of the speed distribution profile for the respective position.

10. The method of any of claim 9, wherein the speed of travel is one of:

a 50th percentile speed or higher; or a 75th percentile speed or higher.

11. The method of claim 1, comprising using the data indicative of the speed of travel of devices along the navigable stretch to determine the validity of the message by comparing the speed data with a threshold speed for travel along the navigable stretch based on historic data.

12. The method of claim 1, further comprising identifying the actually affected navigable stretch by reference to a relative change in the speed of travel of the devices with respect to position along the navigable stretch selected and/or by reference to a speed threshold.

13. The method of claim 12, wherein modified or new message comprises information indicative of the initial navigable stretch, and wherein the actually affected navigable stretch is shorter than and/or located within the initial navigable stretch.

14. The method of claim 1, further comprising using positional data relating to the movement of a plurality of devices along the actually affected navigable stretch to determine an expected speed of travel along the actually affected navigable stretch, and associating the determined expected speed with the modified or new message.

15. The method of claim 1, further comprising using positional data relating to the movement of a plurality of devices along the actually affected navigable stretch to determine an expected path of travel along the actually affected navigable stretch, wherein the path is a lane level path, and associating the determined expected path with the modified or new message.

16. The method of claim 1, further comprising storing the modified or new message in a database.

17. The method of claim 1, further comprising using positional data relating to the movement of a plurality of devices along the actually affected navigable stretch to determine a severity of the impact of the event upon traffic flow, and associating the determined severity with the modified or new message.

18. A non-transitory computer readable medium comprising computer readable instructions, which, when executed on a computer, cause the computer to perform a method for improving a message indicative of an event affecting traffic flow on at least a portion of one or more navigable segments, the method comprising:

obtaining a message with associated location information indicative of a location of an event affecting traffic flow;

using the location information to identify an initial navigable stretch comprising at least a portion of one or more navigable segments on which traffic flow is considered to be affected by the event;

obtaining positional data relating to the movement of a plurality of devices along a navigable stretch selected using the location information, wherein the navigable stretch includes at least the initial navigable stretch;

using the positional data to obtain speed data indicative of a speed of travel of the devices at a plurality of positions along the navigable stretch;

using the speed data to identify an actually affected navigable stretch comprising at least a portion of one or more navigable segments that is actually affected by the event; and modifying the message, or generating a new message indicative of the event, so as to include location information indicative of the actually affected navigable stretch.

19. A system for verifying and/or improving a message indicative of an event affecting traffic flow on at least a portion of one or more navigable segments, the system comprising:

one or more processors; and a memory comprising instructions which, when executed by the one or more processors, cause the system to:

obtain a message with associated location information indicative of a location of an event affecting traffic flow;

use the location information to identify an initial navigable stretch comprising at least a portion of one or more navigable segments on which traffic flow is considered to be affected by the event;

obtain positional data relating to the movement of a plurality of devices along a navigable stretch selected using the location information, wherein the navigable stretch includes at least the initial navigable stretch;

use the positional data to obtain speed data indicative of a speed of travel of the devices at a plurality of positions along the navigable stretch;

use the speed data to identify an actually affected navigable stretch comprising at least a portion of one or more navigable segments that is actually affected by the event; and modify the message, or generate a new message indicative of the event, so as to include location information indicative of the actually affected navigable stretch.

* * * * *